United States Patent
Lerche et al.

(10) Patent No.: US 9,121,949 B2
(45) Date of Patent: Sep. 1, 2015

(54) METHOD AND ELECTRONIC CIRCUIT FOR READING THE SIGNALS GENERATED BY ONE OR MORE PIXELATED SENSORS

(75) Inventors: Christoph Werner Lerche, Valencia (ES); Vicente Herrero Bosch, Valencia (ES); Angel Sebastiá Cortés, Valencia (ES); José María Benlloch Baviera, Valencia (ES); Filomeno Sánchez Martínez, Valencia (ES)

(73) Assignee: Oncovision, General Equipment for Medical Imaging, S.A., Valencia (ES)

( * ) Notice: Subject to any disclaimer, the term of this patent is extended or adjusted under 35 U.S.C. 154(b) by 732 days.

(21) Appl. No.: 13/504,041

(22) PCT Filed: Oct. 26, 2010

(86) PCT No.: PCT/ES2010/070694
§ 371 (c)(1),
(2), (4) Date: Aug. 2, 2012

(87) PCT Pub. No.: WO2011/051529
PCT Pub. Date: May 5, 2011

(65) Prior Publication Data
US 2012/0307025 A1     Dec. 6, 2012

(30) Foreign Application Priority Data

Oct. 26, 2009    (ES) .................................. 200930905

(51) Int. Cl.
*G06G 7/00*    (2006.01)
*G01T 1/17*    (2006.01)
(Continued)

(52) U.S. Cl.
CPC .. *G01T 1/17* (2013.01); *H04N 5/32* (2013.01); *H04N 5/376* (2013.01)

(58) Field of Classification Search
CPC ............... G06J 1/00; G06G 7/06; G06G 7/02; G06G 7/22; G06G 7/14; B82Y 10/00; G06N 3/0635; G06N 3/063; G06E 3/005
USPC .................................. 708/3, 5, 7–8, 801–802
See application file for complete search history.

(56) References Cited

U.S. PATENT DOCUMENTS

| | | |
|---|---|---|
| 3,011,057 A | 11/1961 | Anger |
| 4,550,432 A | 10/1985 | Andersson |

(Continued)

FOREIGN PATENT DOCUMENTS

WO    WO 2004/090572    10/2004

OTHER PUBLICATIONS

Lerche C W et al. "Fast circuit topology for spatial signal distribution analysis", 17th Real-Time Conference—IEEE-NPSS Technical Committee on Computer Applications in Nuclear and Plasma Science, 2010, Piscataway, NJ, USA, 8 pages.*

(Continued)

*Primary Examiner* — Tan V. Mai
(74) *Attorney, Agent, or Firm* — Wenderoth, Lind & Ponack, L.L.P.

(57) ABSTRACT

The subject matter of the invention is a method and an electronic circuit for reading the signals generated by one or more pixelated sensors in a gamma radiation detection system, which makes it possible to substantially reduce the number of electronic channels to be digitized. The electronic circuit in the invention is analog and can also be coupled to other similar circuits in order to acquire the signals from larger sensors.

11 Claims, 12 Drawing Sheets

(51) Int. Cl.
*H04N 5/32* (2006.01)
*H04N 5/376* (2011.01)

(56) References Cited

U.S. PATENT DOCUMENTS

| | | | |
|---|---|---|---|
| 4,622,467 A | 11/1986 | Britten et al. | |
| 4,675,526 A | 6/1987 | Rogers et al. | |
| 6,365,950 B1 | 4/2002 | Sohn | 257/431 |
| 7,342,232 B2 | 3/2008 | Xie et al. | |
| 2006/0192128 A1 | 8/2006 | Benlloch Bavciera et al. | 250/369 |

OTHER PUBLICATIONS

P. Bartzakos et al., "A Depth-Encoded PET Detector", IEEE Transactions of Nuclear Science, vol. 38, No. 2 (1991) pp. 732-738.

D.M. Binkley et al., "A Power-Efficient, Low-Noise, Wideband, Integrated CMOS Preamplifier for LSO/APD PET Systems", IEEE Transactions of Nuclear Science, vol. 47, No. 3 (2000) pp. 810-817.

M. Campbell et al. "A Readout Chip for a 64 x 64 Pixel Matrix with 15-bit Single Photon Counting", IEEE Transactions of Nuclear Science, vol. 45, No. 3 (1998) pp. 751-753.

S.R. Cherry et al . "A High Resolution PET Scanner for Imaging Small Animals", IEEE Transactions of Nuclear Science, vol. 44, No. 3 (1997) pp. 1161-1166.

Vicente Herrero et al., "Front-end circuit for position sensitive silicon and vacuum tube photomultipliers with gain control and depth of interaction measurement", Nuclear Instruments and Methods in Physics Research A 576 (2007) pp. 118-122.

Alexander Hornberg, "Handbook of Machine Vision Algorithms" Wiley-VCH (2006).

Christoph Werner Lerche et al., "Depth of γ-Ray Interaction Within Continuous Crystals From the Width of Its Scintillation Light-Distribution", IEEE Transactions of Nuclear Science, vol. 52, No. 3 (2005) pp. 560-572.

W.W. Moses et al., "Design Studies for a PET Detector Module Using a Pin Photodiode to Measure Depth of Interaction", IEEE Transactions of Nuclear Science, vol. 41, No. 4 (1994) pp. 1441-1445.

Morton Nadler et al., "Pattern Recognition Engineering", John Wiley & Sons, Inc. (1993).

N. Ollivier-Henry et al., "A front-end readout mixed chip for high-efficiency small animal PET imaging", Nuclear Instruments and Methods in Physics Research A 571 (2007) pp. 312-316.

B. Pichler et al., "Studies with a Prototype High Resolution PET Scanner based on LSO-APD Modules", IEEE (1998) pp. 1649-1653.

J. Seidel et al., "Depth Identification Accuracy of a Three Layer Phoswich PET Detector Module", IEEE Transactions of Nuclear Science, vol. 46, No. 3 (1999) pp. 485-490.

M. Streun et al., "A PET system with free running ADCs", Nuclear Instruments and Methods in Physics Research A 486 (2002) pp. 18-21.

8 3D-Impact Position Reconstruction, pp. 119-127.

J. Torkel Wallmark, "A New Semiconductor Photocell Using Lateral Photoeffect", Proceedings of the IRE, vol. 45, No. 4 (1957) pp. 474-483.

M. Wend et al., "A High-Speed, Low-Noise CMOS 16-Channel Charge-Sensitive Preamplifier ASIC for APD-Based PET Detectors", IEEE Nuclear Science Symposium Record, vol. 1 (2002) pp. 539-543.

J.Y. Yeom et al., "A waveform sampling front-end ASIC for readout of GSO/APD with DOI information", Nuclear Instruments and Methods in Physics Research A 571 (2007) pp. 381-384.

* cited by examiner

METHOD AND ELECTRONIC CIRCUIT FOR READING THE SIGNALS GENERATED BY ONE OR MORE PIXELATED SENSORS

CROSS-REFERENCE TO RELATED APPLICATIONS

The present application is a 35 U.S.C. §371 national phase conversion of PCT/ES2010/070694, filed Oct. 26, 2010, which claims priority of Spanish Application No. P 200930905, filed Oct. 26, 2009, the contents of which are incorporated by reference herein. The PCT International Application was published in the Spanish language.

INVENTION OBJECT

The object of the invention is a procedure and an electronic circuit to read the signals generated by one or more pixel sensors that enable to substantially reduce the number of electronic channels to digitize. The invention is applicable to devices used in the detection of light or gamma radiation in medical imaging, as well as in artificial vision and other similar applications.

INVENTION BACKGROUND

Gamma Radiation Detectors

The detection of gamma rays is essential in many applications of nuclear medicine, astrophysics and experimental physics of high energies. Due to the quantum nature of gamma rays, their detection is carried out by their interaction with the detector material, and therefore, the simultaneous measurement of several key (observable) parameters of this interaction is understood as the detection of gamma ray, for example, the deposited energy and the position of the interaction. The interaction of the gamma ray with the detector material is almost exclusively in the multiple ionization of the material by elementary effects such as the photoelectric effect or Compton scattering. Due to the fact that the nature of these processes is statistical, it is only possible to predict the probability of the interaction of the gamma ray with the detector material. This probability of interaction depends on both the energy of the gamma ray and the mass attenuation coefficient of the material with which it interacts. The mass attenuation coefficient depends on the effective $Z_{eff}$ atomic number of the components, the density and thickness of the material that the gamma ray has to pass through. The probability of interaction grows with $Z_{eff}$ and decreases with the energy of the gamma ray. In the event that the gamma ray interacts with the material, it creates a load due to multiple ionization (in the case of semiconductor detectors) or there is an emission of light (in the case of scintillator crystals) that has to be collected and analyzed to obtain information on the interaction of the gamma ray. Therefore, the gamma-ray detectors have to be built in such a way to stop the gamma ray, and also to detect the electrical loads released by ionization or the emitted light. The different needs for the optimal collection of the load or light and a high probability of detection are incompatible in many cases. Particularly in the detection of medium and high gamma-ray energies, where the material is needed with mass attenuation coefficients and with high $Z_{eff}$ values and with a considerable thickness. For this reason, gaseous and liquid detectors are less suitable for the detection of gamma rays, because of their density and low $Z_{eff}$ values.

Semiconductor detectors are suitable only for low energies, and may be used in the detection of X-rays and to a limited extent in gamma radiography. In Positron Emission Tomography (PET), the annihilation photons of 511 kev have to be detected. Although there are compound semiconductors such as the CdZnTe with a density of 5.8 g/cm$^3$ and a $Z_{eff}$ of 49, by the time it is not possible to obtain detectors sufficiently effective for their application in the detection of high-energy gamma rays such as PET, Astrophysics or experimental physics of high energies. This is due to the fact that the thickness has to be small to allow an efficient collection of the released load.

Scintillation detectors avoid this conflict of design, since they make the load of the ionization by the gamma ray in scintillation light. Instead of the load, in this case, light photons are collected, which require the use of photodetectors as vacuum photomultipliers, Silicon photomultipliers or photodiodes. The total amount of the scintillation light is approximately proportional to the total amount of released energy. Due to the fact that highly transparent scintillators may be created to their own scintillation light, it is possible to make the scintillation crystal large enough and with a high $Z_{eff}$ to ensure a high detection efficiency without compromising the collection of scintillation light. However, the released energy, and therefore the amount of scintillation light, is usually very small and will normally require amplification means in addition to means for the detection of photons of light. In the case of scintillators, the energy released by the gamma ray is converted into scintillation light, and subsequently it is converted into electrical pulses through opto-electronic converters, such as photodiodes, avalanche photodiodes, vacuum photomultipliers, silicon photomultipliers or similar photomultipliers. Avalanche photodiodes, vacuum photomultipliers, and silicon photomultipliers inherently amplify the load created from detected scintillation light photons.

The generation of scintillation light is isotropy in the most of the scintillator crystals and it is due to an inverse-square law. This makes the determination of the parameters of interest difficult, such as the energy and position of the gamma ray photoconversion inside the scintillationcrystal. While for the estimation of energy, the detection of the total amount of scintillation light is only needed, the measure of the photoconversion position requires photodetectors sensitive to position. By using the center of gravity algorithm (COG), introduced by J. T. Wallmark [Wallmark 1957], the estimate of two of the three coordinates of the photoconversion position may be obtained. This algorithm is also known as Anger logic. Due to its efficiency, this algorithm remains as the most commonly used for gammagraphy and PET today. However, the use of the COG in monolithic crystals with a high thickness introduces artifacts near the edges of the crystal and does not allow measuring the depth of interaction (DOI), i.e. the third coordinate of the photoconversion position. The lack of an estimate of the DOI leads to parallax error, also known as radial elongation, significantly worsening the spatial resolution in the peripheral regions of the detection camera or PET scanner field of view.

To remedy this problem, several techniques to measure the DOI were developed, such as the Phoswich method, the light-sharing method and other ([Moses1994, Bart1991]). The disadvantage of these methods is that they require additional photodetectors or scintillators, which considerably increase the price of the detector. The problem of the artifacts is avoided by using small pixel matrix sizes of scintillators optically decoupled among them. The measurement of two coordinates of the photoconversion position is reduced to identify the pixel where the generation of scintillation light has occurred. For this deployment, the intrinsic resolution of the detector is given by the pixel size and, consequently, an improvement of this resolution requires a reduction of the pixel size. Although this involves serious problems, such as the deterioration of the detector efficiency, a low energy resolution, Compton diffraction between crystals and increase in the cost of the detector, the current trend is toward the development of detectors with increasingly smaller pixels. This development involves an exponential growth in the number of pixels in the photodetectors sensitive to position. In the case of photomultipliers sensitive to position, there is duplication on the number of pixels every 7 years.

A large number of pixels is beneficial to the spatial resolution of the system, and therefore to the quality of the acquired image, but it impairs the energy resolution by decreasing the pixel size and causes severe problems in the data acquisition system. In the case of digitizing the signal from each pixel, the same acquisition system limits its number due to the fact that the complexity grows rapidly with the number of channels. For this reason, it is necessary to perform a pre-processing of the signals in order to reduce the number of electronic channels.

Any gamma-ray detector has a data acquisition system to make the information contained in the distribution of detected energy accessible to computer means for its processing and analysis. This system will depend on its design and benefits, and strongly on the design of the gamma-ray detector. Due to the fact that gaseous detectors and semiconductors are not suitable for their application in PET, the techniques used with scintillation detectors will only be discussed below. For segmented scintillator detectors, the data acquisition is aimed at identifying the pixel in which the photoconversion has occurred.

The scintillator segmentation in smaller and elongated pixels channels the light toward the photodetector where the amount of energy released by the gamma ray in this pixel occurs. For the optimization of the collection of scintillation light, all surfaces are covered with reflectors. Due to the pixel size, the reflecting surfaces and the fact that only total amount of light is measured, there is no information about the position of the gamma ray photoconversion within the pixel. The gamma-ray detector, in this case, consists of a multitude of pixels which are optically coupled to a photodetector matrix or to one or several photodetectors sensitive to position. The coupling may be direct or through a light guide. The reading of the photodetector matrix or photodetectors sensitive to position may be done in different ways. An obvious solution is to couple exactly each segment of scintillator to a single pixel of the photodetector and digitize the signal of each pixel (for example [Pichler1997, Binkley2000]). This implementation allows to easily determining the position of the photoconversion of gamma ray by identifying the pixel and it also allows discrimination by energy. The disadvantages of this implementation are: the need for a high number of electronic channels (one per pixel), the lack of information of the DOI, and a spatial resolution limited by the pixel size. The problem of the lack of information on the DOI may be solved with photodetectors or additional scintillator crystals by using the methods of lightsharing (for example [Moses1994]) and Phoswich (for example [Seidel1999]) with the disadvantage of making the detectors more expensive due to the need for additional electronic channels (for the lightsharing method) or the sampling of the waveform of the signal from the photodetector. There are several proposals for Application-Specific Integrated Circuits (ASIC) to implement these reading methods of photodetectors (for example [Olli2007, Weng2002, Yeom2007]).

For the reduction in the number of electronic channels, there are several methods. One method is to establish a threshold for each pixel and to count the events exceeding such threshold [Camp1998]. This prevents the discrimination by energy and therefore, it limits the usefulness of the method. In the case of using photomultipliers with reading of the last dynode, it is possible to use this method without preventing the discrimination by energy [Streun2002]. Another method for the reduction of electronic channels takes advantage of the fact that in a scintillator segment matrix, it is unlikely to have two photoconversions of two independent gamma rays in the same instant, provided that the activity of the source to be detected is sufficiently low, and the resolution of analog to digital converters (ADC) may be higher than the resolution required by the spatial resolution and the intrinsic energy of the detector (U.S. Pat. No. 7,342,232 B2). This allows the division of the maximum range of ADC input at various intervals, where the values of each of these intervals are reserved for a single segment of crystal. By using a transformation, the signal of the corresponding photodetector pixel is adapted to the reserved range for the segment. If there is only a single photoconversion in the window of the digitization, the crystal segment where this occurred may be identified unequivocally.

Another possibility for reducing the number of electronic channels is the center of gravity algorithm. This algorithm remains one of the most widely used due to its low cost, easy implementation through networks of load dividers and because it may be combined with the lightsharing and phoswich methods for the detection of the interaction depth. However, the COG has some disadvantages, especially if used in monolithic crystals, although the use of these allows the construction of more efficient detectors, easier to assemble. The most important disadvantage is the emergence of systematic errors in the detection of the photoconversion position near the edges. Another significant disadvantage is the lack of scalability if it is implemented by networks of load dividers and finally it does not allow the use of lightsharing method for the detection of the interaction depth. It has recently been demonstrated that the networks of load division may be modified to estimate the interaction depth [Lerche2006, Benlloch2006] in monolithic scintillator crystals by measuring the time of second-order distribution of the load collected at photo-detection (Pub. No.: WO/2004/090572, Lerche et al.). It has also been shown that with this measurement by the moment of second-order, the artifacts generated by the center of gravity algorithm in monolithic crystals may be corrected partially [Lerche2006]. An integration of this network of load division with depth interaction measure in the form of ASIC [Herrero2007] improves its performance, but restricts its usefulness. For the implementation of the resistive network in the ASIC, the number and configuration of the photodetector segments should be known. Although this specific ASIC could also be used for photodetectors with a smaller number of segments and similar configuration, the performance of the ASIC in this application will not be optimal. It is not possible to combine several resistive networks capable of measuring the second moment of the distribution of the light detected for use in a photodetector with a larger number of segments. Therefore, for each configuration of the photodetector segments, a dedicated ASIC must be designed. Other limitations of this solution are presented by a) the high complexity in the case of photodetectors with a very large number of segments, such as the XP85022 from Burle Industries, which has 1024 segments; (b) the fact of the difficult implementation of the measurement of moments with an order higher than two; and (c) the fact that the weights for the computation of the moments are hard-coded, that is, once the resistive network is deployed, these weights cannot be changed. A possible solution to the computation of moments with an order higher than two is detailed in U.S. Pat. No. 4,550,432 (Andersson), although in this device the moments are calculated digitally, which implies a large number of ADC converters and evaluations for each load distribution that significantly reduce their usefulness for particle detectors, due to the limited time available between two events to perform both the digitization and the subsequent calculations.

On the other hand, almost all scintillator crystal based systems of gamma ray detection are modular. Each module in turn is composed of a monolithic crystal (without segmenting or partially segmented) or a crystal matrix (pixels) optically coupled to a photodetector or a matrix of photodetectors. Each detector module works independently. However, the case of coupling some modules with other modules to implement various larger size modules from a basic module, has been suggested. In this case, it is stated that the readout electronic circuit is scalable, i.e. that it is able to connect with the circuits of the neighboring elementary modules so that the result works as a single module.

Finally, in the reduction of the number of electronic channels, it is important not to damage the quality of the resulting information. Therefore, the introduction of the analog determination of the third moment of the load distribution (skewness), fourth moment (kurtosis), or higher-order moments would be convenient. These moments would enhance the information on the original interaction position without substantially increasing the number of signals to digitize. For example, the third moment of the light distribution may be relevant to enhance the spatial resolution in the region close to the crystal edge. Theoretically, from the precise determination of all Cartesian moments of the load distribution, it is possible to reconstruct the 3D impact point of the gamma ray in a monolithic crystal.

Due to the rapid growth in the number of segments in photodetectors and in segmented semiconductor detectors, several methods for the rapid and efficient reading of electronic channels have been developed, including diagrams for the reduction in the required number of analog-digital converters. In nuclear medicine, previous devices are based on the center of gravity algorithm introduced by Hal Anger, U.S. Pat. No. 3,011,057, on improved versions of this method, for example Pub. No.: WO/2004/090572, Lerche et al., or in the grouping of segments along the spatial coordinates, in such a way that this stage of electronics performs the projections of signal distribution along the axis of spatial coordinates. Examples of devices that use this method are described in U.S. Pat. No. 4,675,526, Rogers et al., U.S. Pat. No. 4,622,467 Britten et al. These methods always have at least one of the following disadvantages:

1. The expansion parameters in basis functions are not reprogrammable (not reprogrammable by the subsequent change in parameters of the expansion in basis functions), because they have been conducted with components such as resistors or capacitors with fixed values. This significantly reduces their usefulness because it involves the irreversible adjustment of the values of these components to the requirements of a single type of photodetectors.
2. The topology of the electronic component is not scalable. That is, it does not allow connecting several modules of this electronic component in order to cover a larger number of segments or several detection modules.
3. The implementation does not allow a change of the basis functions of the expansion of signal distribution. The implementation of the center of gravity method only serves for computing the first Cartesian moments, but it does not allow the computation of Fourier coefficients or other.
4. The implementation of load dividers in ASICs does not allow scalability easily due to the topology and high tolerance in absolute value of the used resistors or capabilities.
5. The implementation of dividers of resistive or capacitive load without decoupling makes the passive equalization impossible through shunts on the signals from the segments in case they are very uneven, for example, in photomultipliers sensitive to position.

Artificial Vision

The artificial vision systems are used for the automatic inspection of manufactured products or during the production cycle, for example in the production of microchips, cars, drugs and even food. These systems allow the detection of objects, their orientation, the measurement of their size, the recognition of defects and other tasks. For this, there are several algorithms that work on the scanned image. A widely used method is the expansion in sets of functions that includes the computation of the image moments [Nadler1993], [Hornberg2006]. Especially, the central moments of second order (described below), since they allow the detection of the extent and orientation of the image of an object. Also, moments of higher order contain additional information about the image. To improve the performance and reduce the costs of vision systems, lately these are integrated completely into a single microchip. These devices are ASICs (Application Specific Integrated Circuits) that contain a CMOS image sensor, for example [Sohn2002], the digitization means for the loads captured in the pixels and also one or several cores of microprocessors. In this way, they allow the treatment of images and the extraction of their properties in the same electronic chip that acquires the image, which includes a clear advantage with respect to the time of image processing, and also to the cost of the system.

INVENTION DESCRIPTION

Figure 1:
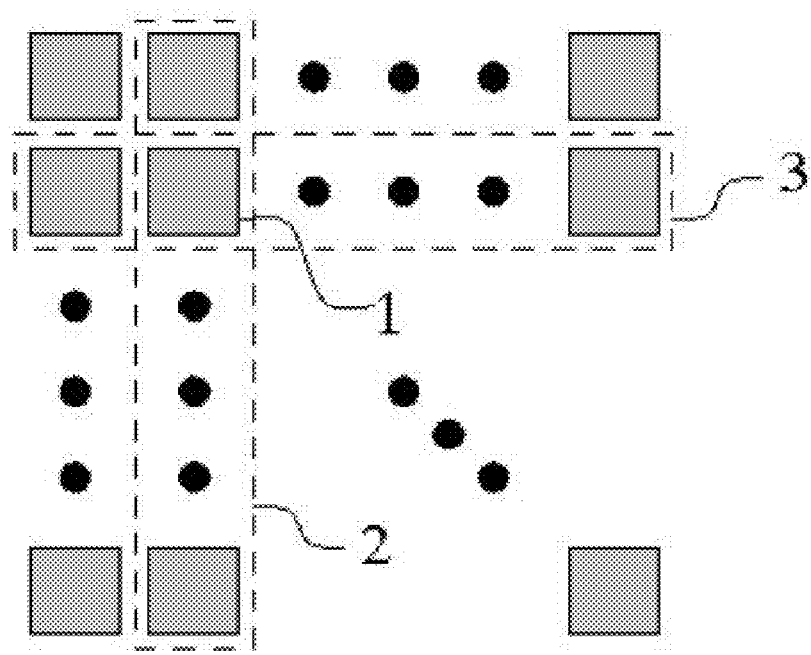
FIG. 1 shows the typical topology of a generic pixel sensor.

This patent describes a procedure and an electronic circuit to read the signals generated by one or more pixel sensors that enable to substantially reduce the number of electronic channels to digitize. The procedure is carried out by a readout electronic circuit based on analog components that allows encoding the original information gathered by pixel sensor(s) through the coefficients of a basis of functions. The readout electronic circuit of the invention is reprogrammable, which allows for its use with different basis of functions, and it is also scalable, so that it may be combined with other identical and adjacent readout electronic circuits.

The procedure and readout electronic circuit of the invention are useful in different fields of application. For example, within the field of medical imaging, it is applicable to gamma ray detectors consisting of one or several monolithic scintillation crystals and one or more position sensitive photodetectors or a matrix of photodetectors forming the detection plane. Another field of application is artificial vision and pattern recognition, especially for the tracking of an object in a (fast) sequence of images, where a very fast and repeated computing of low-order spatial moments is required (U.S. Pat. No. 4,550,432 Andersson). The architecture of this invention meets all the requirements, since it allows the instant computing of several moments in parallel. Another application of the readout electronic circuit of the invention is the instant calculation of impact parameters of a gamma ray detected in radiation detectors for high energy experimental physics, medical physics and astrophysics. For this application, it requires very few coefficients and therefore the invention allows the execution of detectors with very few converter channels from analog to digital. The invention may also be applied to the processing of images taken with a pixel photosensor by analysis of image moments.

The procedure and readout electronic circuit of the invention allows the expansion in a set of basis functions of a two-dimensional distribution shown with a pixel sensor of M×N segments. For this, the M×N signals are multiplied by weights depending on the positions of the segments within the sensor, and then the weighted signals are added, resulting in the coefficients which represent the contribution of the corresponding basis function to the total signal. The readout electronic circuit of the invention is formed by analog components, thus allowing instant obtaining the coefficients, and additionally it is interconnectable with other similar reading devices. In this way, several identical electronic circuits may be interconnected to carry out the expansion in case the M×N number of segments of the sensor is greater than the number of segments that a single circuit may process. Another important advantage of the readout electronic circuit of the invention is that the weights are programmable, which allows the expansion with different sets of basis functions. In addition, the readout electronic circuit of the invention may be integrated into the own substrate of the sensor or sensors, whether photodetectors or detectors of another type.

More specifically, the invention is based on the fact that a $fx$ function may be approximated by an overlay of $P_i x$ a set of orthogonal functions:

$$f(x) \simeq \tilde{f}(x) = \sum_{i=0}^{N} \alpha_i P_i(x) \qquad (1)$$

where $\alpha_i$ coefficients are calculated according to $$\alpha_i = \int_a^b f(x) P_i(x) dx \qquad (2)$$

and $P_i x$ functions meet $$\int_a^b P_i(x) P_j(x) dx = \delta_{i,j} \qquad (3)$$

Examples for sets of orthogonal functions include the Legendre polynomials, Gegenbauer polynomials, Chebyshev polynomials, Laguerre polynomials, Hermite polynomials, Zernike polynomials, trigonometric functions used in Fourier series and many more. The $\alpha_i$ coefficients are called Legendre moments, Chebyshev moments, etc., according to the polynomials used in equation 2. In the case of Fourier expansion, the $\alpha_i$ coefficients are the spatial frequencies and functions are the exponential with $j=\sqrt{-1}$. In the event that the $P_i x$ functions are monomials of $x^i$ shape, the $\alpha_i$ coefficients are the moments of the Cartesian function $fx$. Although the monomials are not orthogonal, it is possible to reconstruct $fx$ from $\alpha_i$. The equations 1, 2, and 3 may be generalized for functions $f\bar{x}$ where $\bar{x} \in \Re^n$ and $n>1$. The objective of this invention is to implement the computation of $\alpha_i$ coefficients of analog and programmable form so that with the same readout electronic circuit, different $P_i x$ basis functions may be implemented. The fact that the readout electronic circuit is analog makes it fast enough for its use in particle detectors, and the fact that the $P_i x$ weights are programmable, makes it sufficiently flexible and scalable to enable its use in particle detectors with a wide range of segments.

The following description of the invention is made in relation to a generic pixel sensor, which according to the application, may be a position sensitive photodetector, a segmented photodetector, one or more gamma scintillator sensors, CMOS image sensors, or other sensors known to an expert in the field. The pixel sensor has a matrix of N×M segment 1 of finite area $\Omega_{l,k}$ with l=1 . . . N and k=1 . . . M. In consequence, the equation (2) becomes $$\alpha_i = \sum_{l=1}^{N} P_i x_l \int fx\, dx \quad (4)$$

in the one-dimensional case and $$\alpha_{i,j} = \sum_{l=1}^{N} \sum_{k=1}^{M} P_i x_l P_j x_k \int \int fx, y\, dx\, dy \quad (5)$$

in the two-dimensional case, where $x_l$ and $x_k$ are the centers of segments and $\iint fx,ydxdy$ represents the load collected by the segment $\Omega_{l,k}$ of the sensor. Thus, in the case of a photodetector that converts the load to scintillation light, $\iint fx,ydxdy$ would represent the scintillation light collected by the segment $\Omega_{l,k}$. An objective of this invention is the implementation of an electronic form that computes the $\alpha_{i,j}$ coefficients analogically, where $P_i x_l$ and $P_j x_k$ are the weights that may be adjusted at least partially through the programming after the implementation of the circuit. Instead of implementing the electronics for computing the $\alpha_{i,j}$ coefficients, it is possible to reduce the two-dimensional problem of the equation (5) to two one-dimensional problems $$\alpha_i = \sum_{l=1}^{N} P_i x_l \int fx, y\, dy \quad (6)$$

$$\alpha_j = \sum_{k=1}^{M} P_j x_k \int fx, y\, dx$$

where $\int fx,ydy$ is the projection of $fx,y$ along the axis x and $\int fx,ydx$ is the projection of $fx,y$ along the axis y. This significantly reduces the complexity of the readout electronic circuit and the number of data records for the programmable weights. In case of implementing the equation (5) for the first Q coefficients along the directions x and y, it is necessary to save M×N×|Q+1 independent weights, while the set of equations (6) only requires M+N×Q+1. The disadvantage of using the set of equations (6) consists of a reduced Signal to Noise Ratio (SNR), especially if the moments are implemented in such a way that coefficients α represent Cartesian moments. In this case, monomials $P_i x_l P_j x_k = x^{li} x^{jk}$ with elevated i and j amplify considerably the noise of detected $fx,y$. This effect may be reduced by using other polynomials as Legendre, Chebychev, Zernike polynomials, etc. The projection $fx,y$ along axis x and y is obtained by joining the detector segments along columns 2 and rows 3 in FIG. 1. There are photodetectors which have inherently this configuration, such as crossed wire position sensitive photomultipliers or micro strip detectors.

Figure 2:
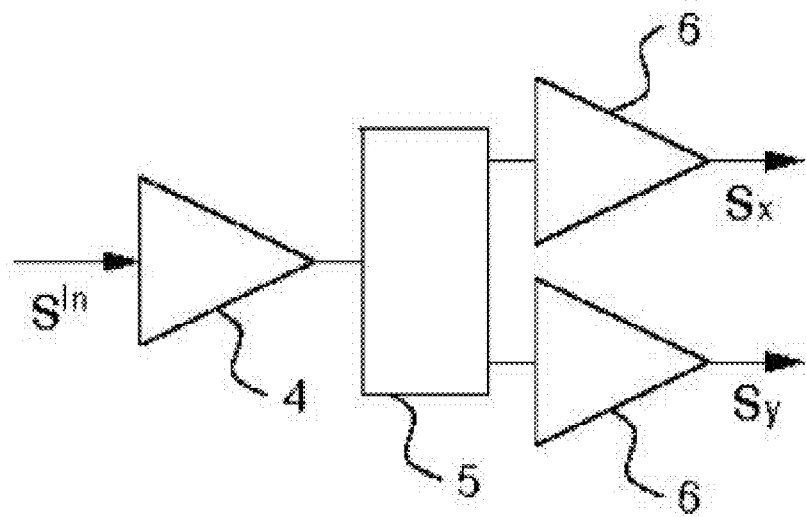
FIG. 2 shows an input stage of a readout electronic circuit according to the invention that makes projections throughout the spatial coordinates before the expansion in basis functions.

For the simultaneous computing for the two projections, signal copy means or proportional division means have to be introduced according to FIG. 2. In this figure, 4 is a variable gain buffer but with equally gain for all M×N segments. This buffer allows the adaptation of impedance and input signal $S^{In}$, since it may be voltage, current or charge but always correspond to $\iint fx,ydxdy$, $\int fx,ydy$ or $\int fx,ydx$. This signal is divided or multiplied by the component 5 and the buffer 6 adapts the signal to the following stages (FIGS. 3, 5, 7 and 8) to decouple the detector output from the rest of the elements. This invention facilitates in this way a pre-processing of the signal to its appropriate conditioning. The fact that the gain of 4 is variable, and with the same value for all M×N segments, allows the adjustment of the sensitivity of the readout electronic circuit to the requirements of different sensors.

Figure 3:
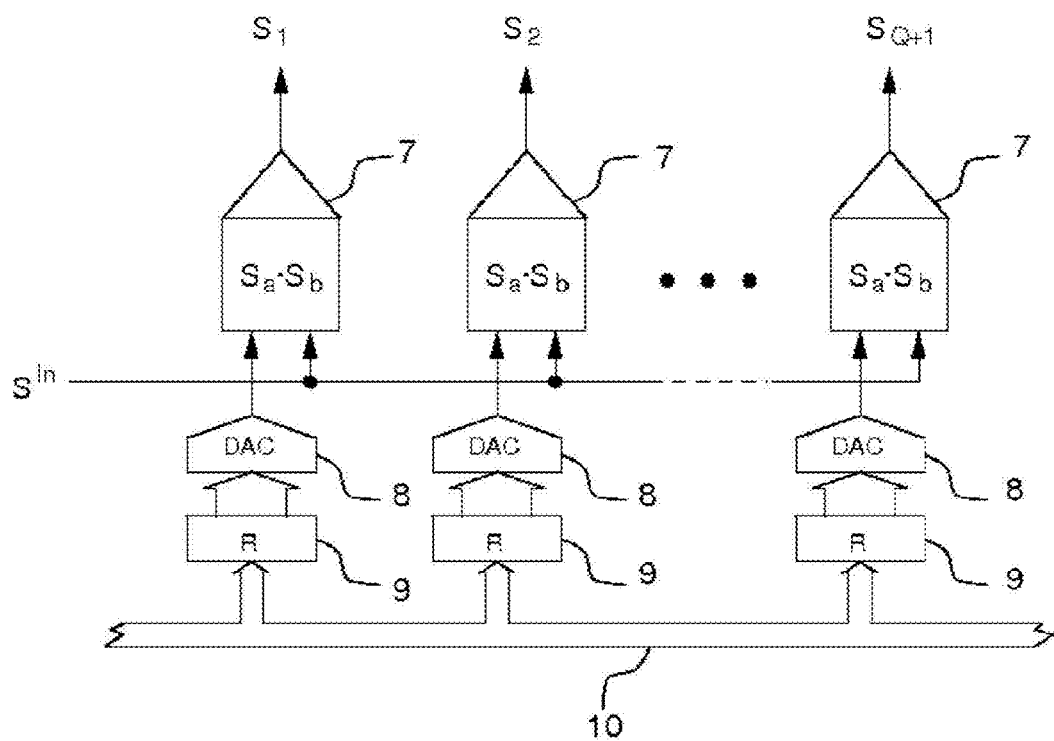
FIG. 3 shows a module of a readout electronic circuit according to the invention that performs the multiplication of an input signal with programmable weights for a spatial dimension.

FIG. 3 shows the stage for the computation of α coefficients according to the equation (6). The analogue multipliers 7 multiply the signal $S^{In}$ by some coefficients that are (a static signal that represents) weights $P_i x_l$ and $P_j x_k$, provided by the analogue-to-digital converter 8. These multiplications give rise to signals $S_1, S_2, \ldots, S_{Q+1}$, where Q is the order of the coefficient with the highest order which is intended to be deployed. To store the appropriate values for the weights $P_i x_l$ and $P_j x_k$, storing means 9 and transfer means of digital data 10 (buses in series or parallel) are implemented. The M×N copies $S_x$ (FIG. 2) are added for all the stages that are in the same column. The M×N copies $S_y$ are added for all the input stages that are in the same row. These additions are used as the input signal $S^{In}$ for the stage of FIG. 3.

Figure 4:
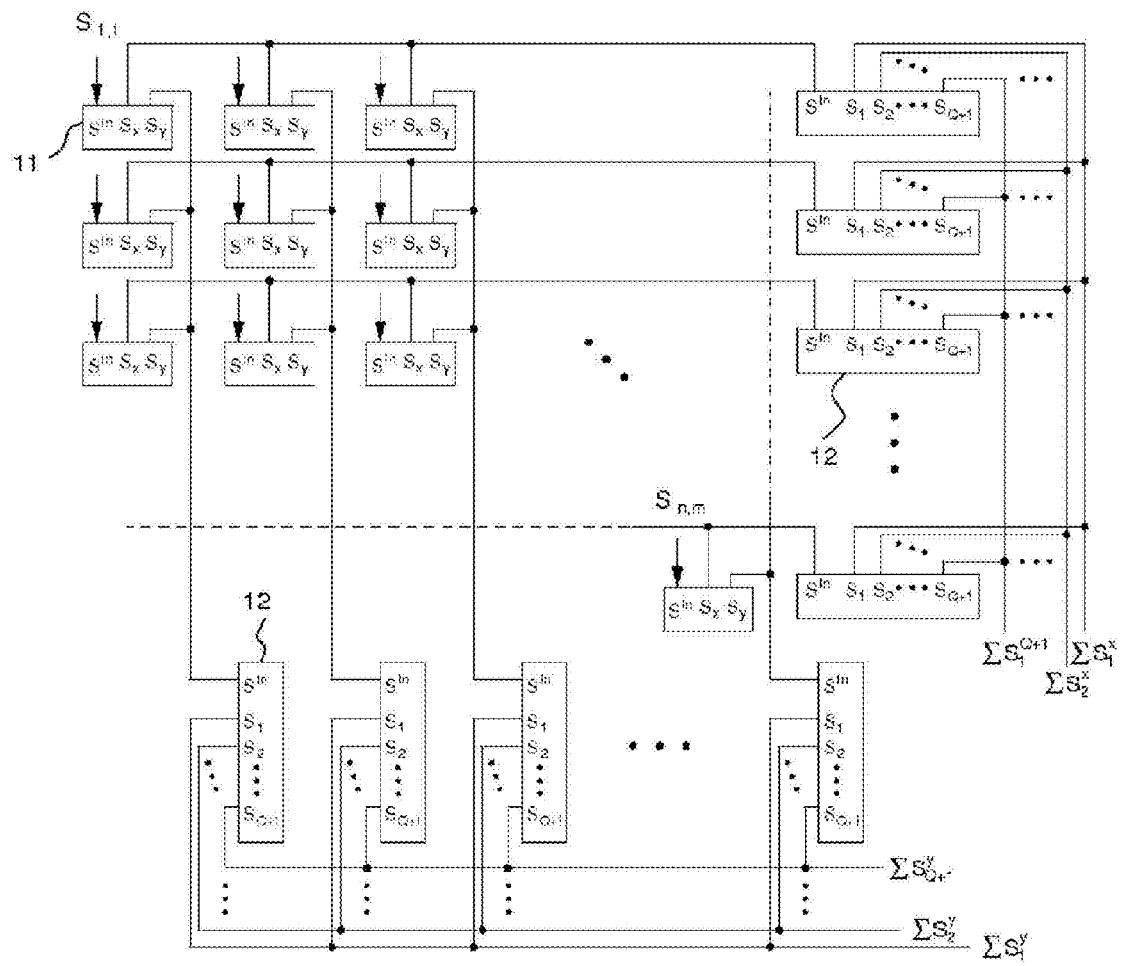
FIG. 4 shows a first execution of the readout electronic circuit according to the invention for the expansion in basis functions with previous projections throughout the spatial coordinates that use the modules in FIGS. 2 and 3.

FIG. 4 shows a first implementation of the readout electronic circuit of the invention where the weighted signals $S^x_1, S^y_1, S^x_2, S^y_2, \ldots, S^x_{Q+1}, S^y_{Q+1}$ are added separately for the two spatial directions and for each order of the coefficient where the elements 11 are the input stages according to FIG. 2 and the elements 12 are the modules of weighted superposition as shown in FIG. 3. The superscript of $S^x_1, S^y_1, S^x_2, S^y_2, \ldots, S^x_{Q+1}, S^y_{Q+1}$ differentiates the spatial coordinate of the two sets of signals $S_1, S_2, \ldots, S_{Q+1}$. For better clarity, buses and records necessary for memorization and the programming of the variable weights have been omitted in FIG. 4.

Figure 5:
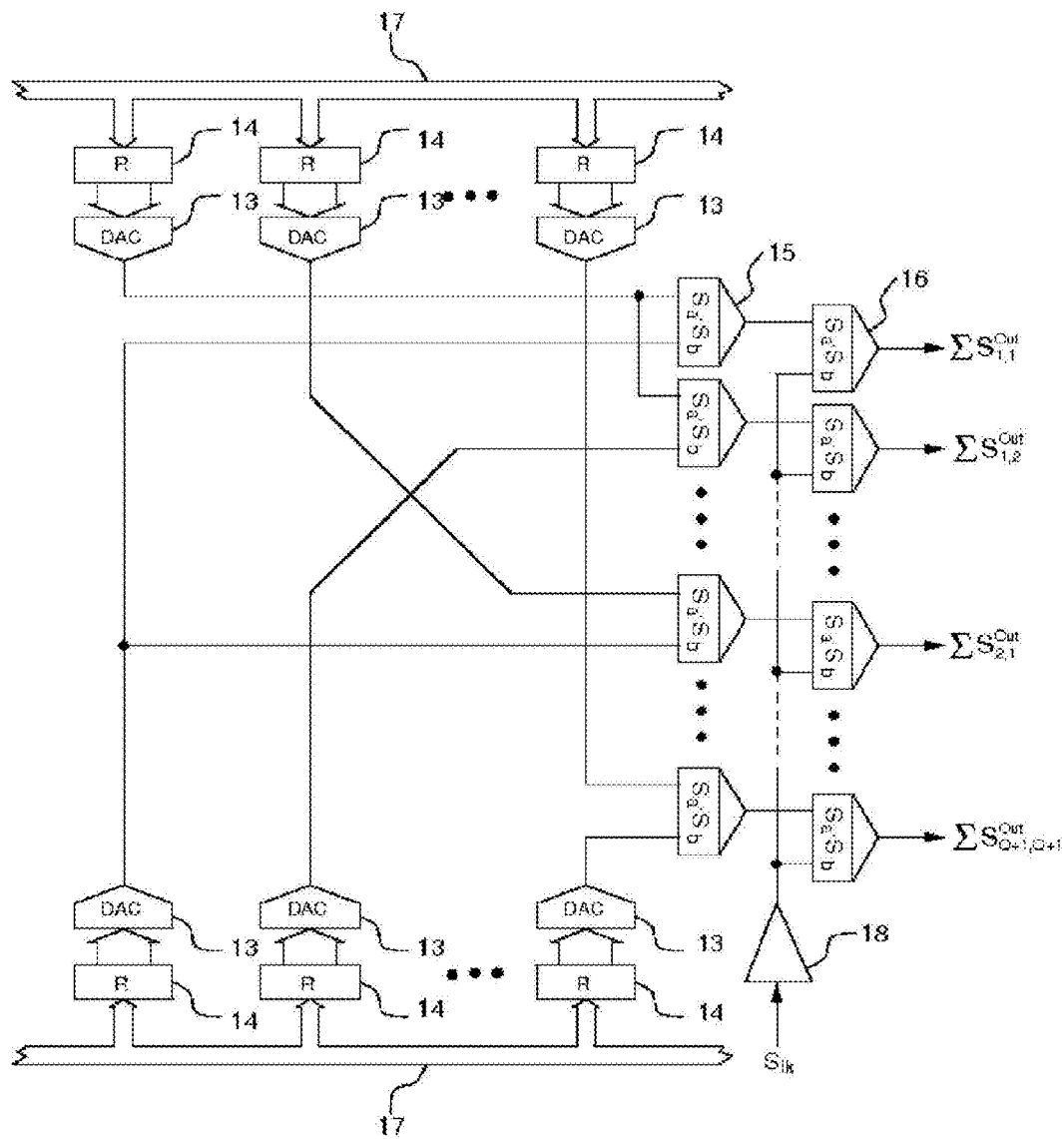
FIG. 5 shows a second execution of the readout electronic circuit according to the invention for the expansion in basis functions without prior projections throughout the spatial coordinates.

FIG. 5, on the other hand, shows a second implementation of the reading electronic circuit of the invention where the equation (5) is implemented directly, without previous projections of the charge distribution $fx,y$ along axis x and y. In this case, it requires one for each N×M detector segments. The signal $S_{l,k}$ of the segment is decoupled to the buffer 18 with variable gain such as in the case of FIG. 2 and is delivered to multipliers 16 that multiply the signal with the static weights $P_i x_l P_j x_k$ obtained with the multipliers 15 from the static weights $P_i x_l$ and $P_j x_k$. The digital-analog converters 13 and storage means 14 provide static weights, where the storage means 14 are programmed through digital data bus 17. For coefficients up to the order Q, $|Q+1^2|+2Q+1$ elements for the multiplication of signals are required, although it is possible to omit some orders due to possible symmetries of $fx,y$ or if the corresponding coefficient contains little information about the distribution $fx,y$. Heavy copies $S_{1,1}, S_{1,2}, \ldots, S_{Q+1,Q+1}$ are added separately for each order of the coefficient $\alpha_{i,j}$. In order to reduce the number of elements necessary for the computation of the coefficients $\alpha_{i,j}$, the flexibility of the circuit may be restricted. If the possibility to allow weights $P_i x_l$ and $P_j x_k$ is waived, leaving as a sole option the monomials $x^i$ and $y^j$, the equation (5) is converted to $$\alpha_{i,j} = \sum_{l=1}^{N} \sum_{k=1}^{M} x_{l^i} x_{k^j} \int \int fx, y | dx dy, \quad (7)$$

where $\alpha_{i,j}$ are approximate Cartesian moments of the distribution $fx,y$. For the implementation of equation (7) in a circuit, it only requires the generation of powers $x^i$ and $y^j$ until the maximum order Q intended to be implemented, and with the variable and programmable values x and y. The product of the powers $x^i$ and $y^j$ is multiplied by the signal $\iint fx,ydxdy$ collected by the segment $\Omega_{l,k}$. These M×N×Q+1 products are added on M×N segments separately for each order of the coefficient $\alpha_{i,j}$.

Figure 6:
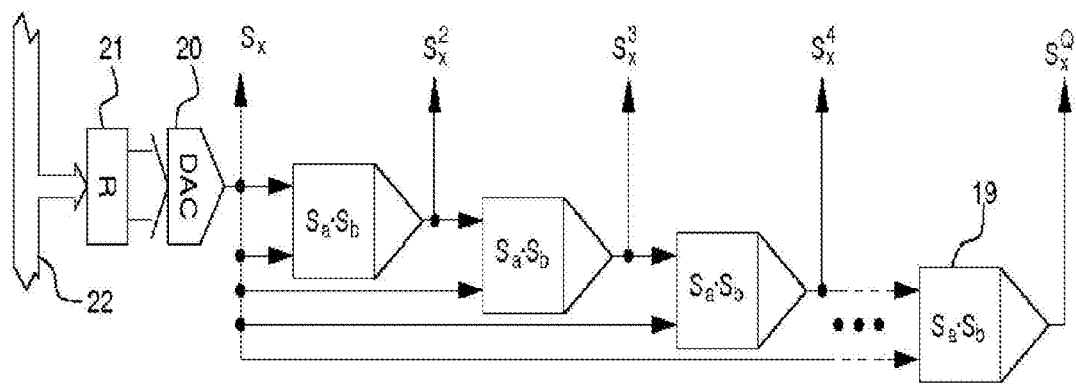
FIG. 6 shows a module of a readout electronic circuit according to the invention that generates the one-dimensional weights for the computation of Cartesian moments.

FIG. 6 shows a cascade of 19 multipliers that generate, from the signal $S_x$, the powers $S_x^r$ with r=1, 2, . . . , Q, $S_x$. It is a static signal, which is provided by the digital to analogue converter 20, memory means 21 and the digital data bus 22. According to FIG. 7 or 8, a stage of multiplication is connected to each of the M×N segments of the photodetector or the radiation detector.

Figure 7:
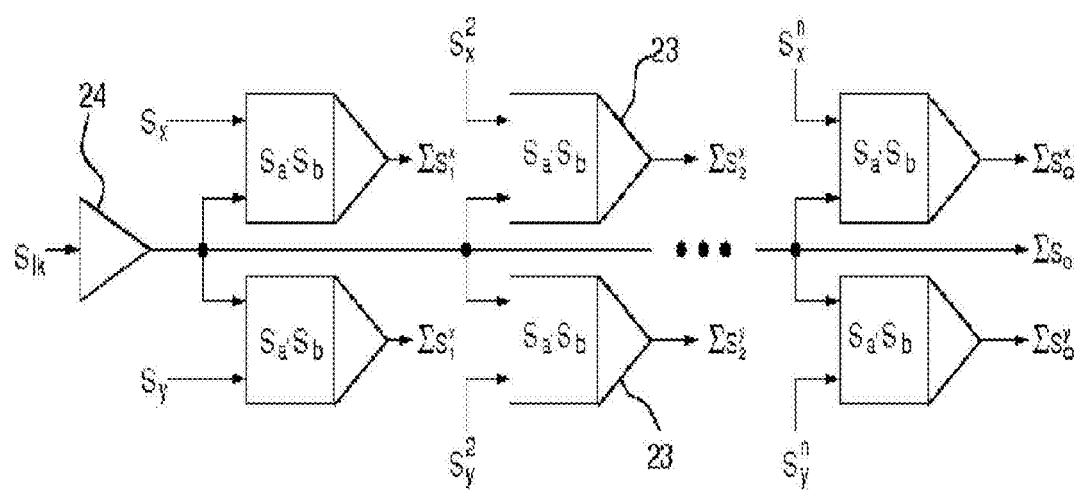
FIG. 7 shows a module of a readout electronic circuit according to the invention that performs the multiplication of an input signal with one-dimensional weights.

In the implementation according to FIG. 7, the Cartesian moments of the distribution ƒx,y are treated independently for two spatial directions x and y. A variable gain buffer 24 equivalent to buffer 6 in FIG. 2 decouples the signal $S_{l,k}$ of the detector and the output signal is divided into several 23 multipliers which perform the multiplication between the signal and the weight. The results of these operations are added separately for each order of the coefficients $\alpha_i$ and $\alpha_j$ through buses $\Sigma S_0, \Sigma S_1^x, \Sigma S_1^y, \Sigma S_2^x, \ldots, \Sigma S_Q^x$ and $\Sigma S_Q^y, \Sigma S_0$ being the total charge received by the M×N segments in the set.

Figure 8:
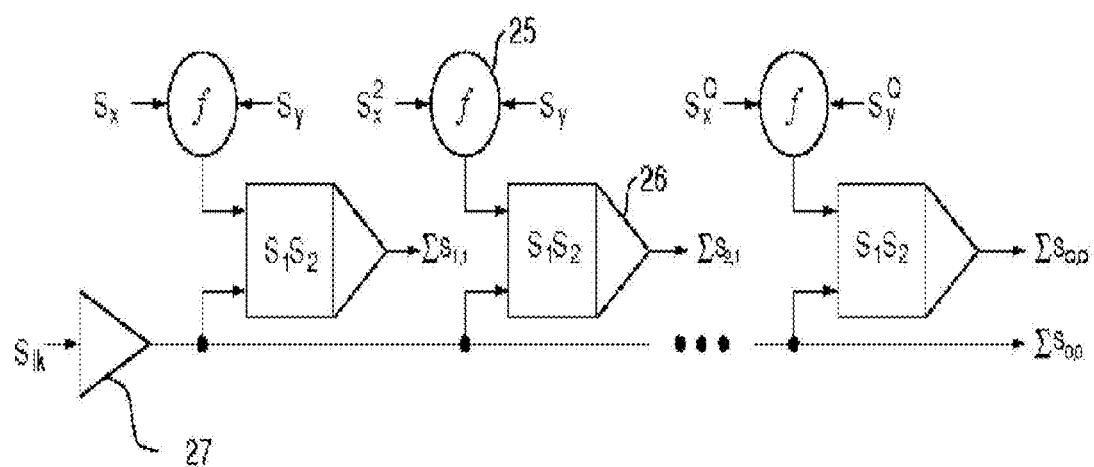
FIG. 8 shows a module of a readout electronic circuit according to the invention that performs the multiplication of an input signal with linear combinations of one-dimensional weights.

The implementation according to FIG. 8 allows the computation of linear combinations of the moments along the two spatial directions. A variable gain buffer 27 equivalent to buffer 6 in FIG. 2 decouples the signal $S_{l,k}$ of the detector and the signal at its output is divided into several multipliers 25 to perform the multiplication between the signal and a weight set obtained from a weight or several weights in the direction x and a weight or several weights in the direction y. The element 25 represents a functional network that implements the linear combination of the inputs and, in the simplest cases, it is a single addition or a single multiplication.

The results of these operations are added separately for each order of the coefficients $\alpha_{i,j}$ through buses $\Sigma S_{0,0}, \Sigma S_{1,1}, \Sigma S_{1,2}, \ldots, \Sigma S_{Q,Q}$, being $\Sigma S_{0,0}$ the total charge received by the M×N segments in the set. Depending on the needs of the application, intermediate orders, (for example by the symmetries ƒx,y) may be omitted. It is also possible to combine the solutions according to FIG. 7 and FIG. 8.

Figure 9:
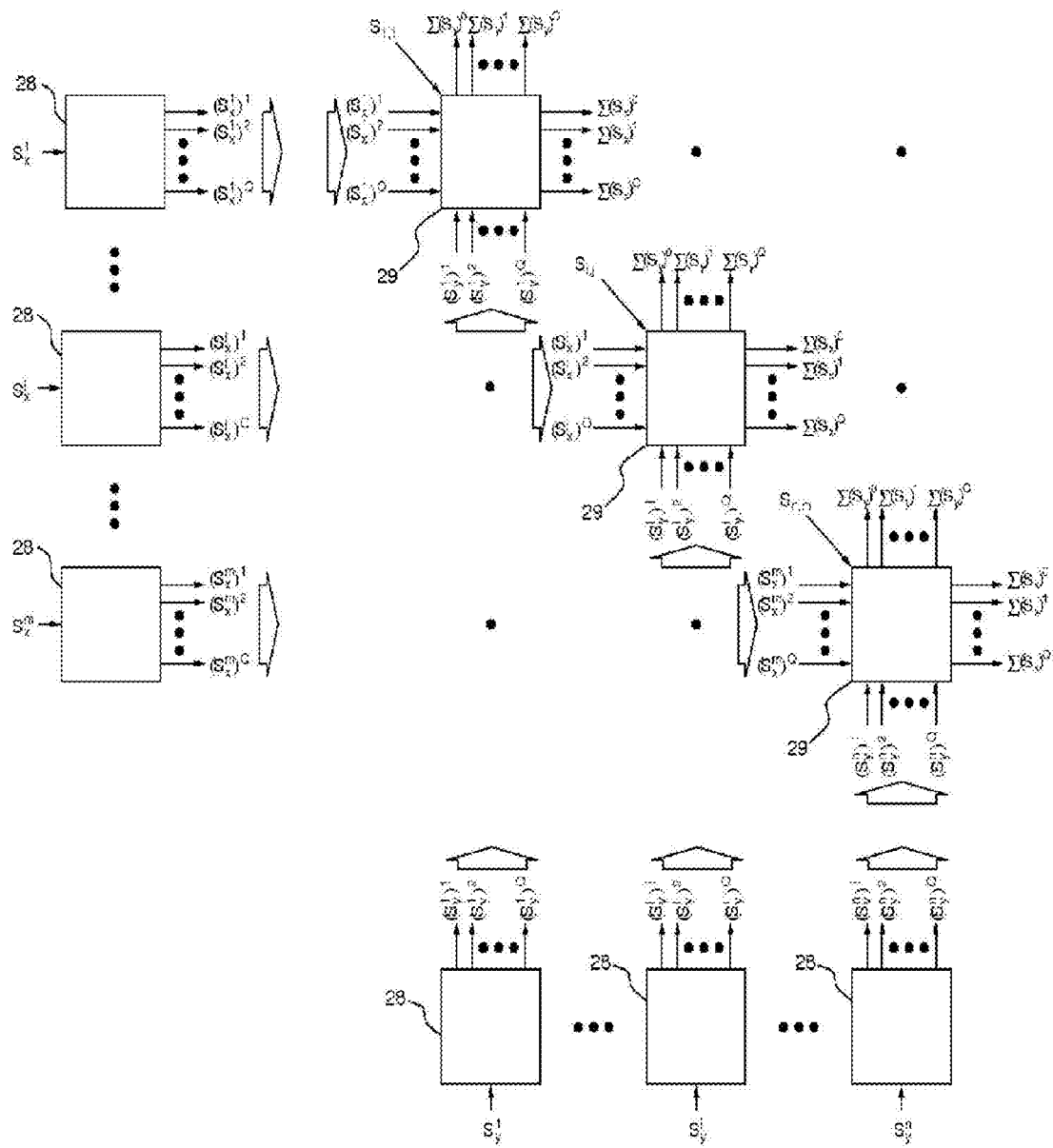
FIG. 9 shows a third execution of the readout electronic circuit according to the invention that performs the computation of the Cartesian moments separated by spatial coordinates using the modules in FIGS. 6 and 7.

FIG. 9 shows a third implementation of the readout electronic circuit of the invention in case of independent treatment of the Cartesian moments at directions x and y. With a total of M+N modules 28 for the generation of weights depending on the circuit in FIG. 6, the powers are generated for (M+N)×Q weights $(S_x^1)^1, \ldots, (S_x^1)^Q, \ldots (S_x^N)^1, \ldots, (S_x^N)^Q$ and $(S_y^1)^1, \ldots, (S_y^1)^Q, \ldots (S_y^M)^1, \ldots, (S_y^M)^Q$ from M+N values $S_x^1$ and $S_y^1$ in records 21 (FIG. 6). Since weights $(S_x^1)^1, \ldots, (S_x^1)^Q, \ldots (S_x^N)^1, \ldots, (S_x^N)^Q$ and $(S_y^1)^1, \ldots, (S_y^1)^Q, \ldots (S_y^M)^1, \ldots, (S_y^M)^Q$ are obtained by repeated multiplication of the stored values $S_x^1$ and $S_y^1$, the circuit as shown in FIG. 9 computes the Cartesian moments of the set of input signals $S_{l,k}$. The (M+N)×Q coefficients are distributed to M×N multipliers 29 according to FIG. 7, which multiply each input signal $S_{l,k}$ with the weights. For better visibility, FIG. 9 only shows 6 of the M+N modules for the generation of weights and 3 of the M×N signal multipliers. The resulting signals M×N×Q are added with analog adders to all modules 29 according to their order Q and spatial direction for obtaining (M+N)×Q Cartesian moments $\Sigma(S_x^1)^1, \ldots, \Sigma(S_x)^Q$ and $\Sigma(S_y^1)^1, \ldots, \Sigma(S_y)^Q$.

Figure 10:
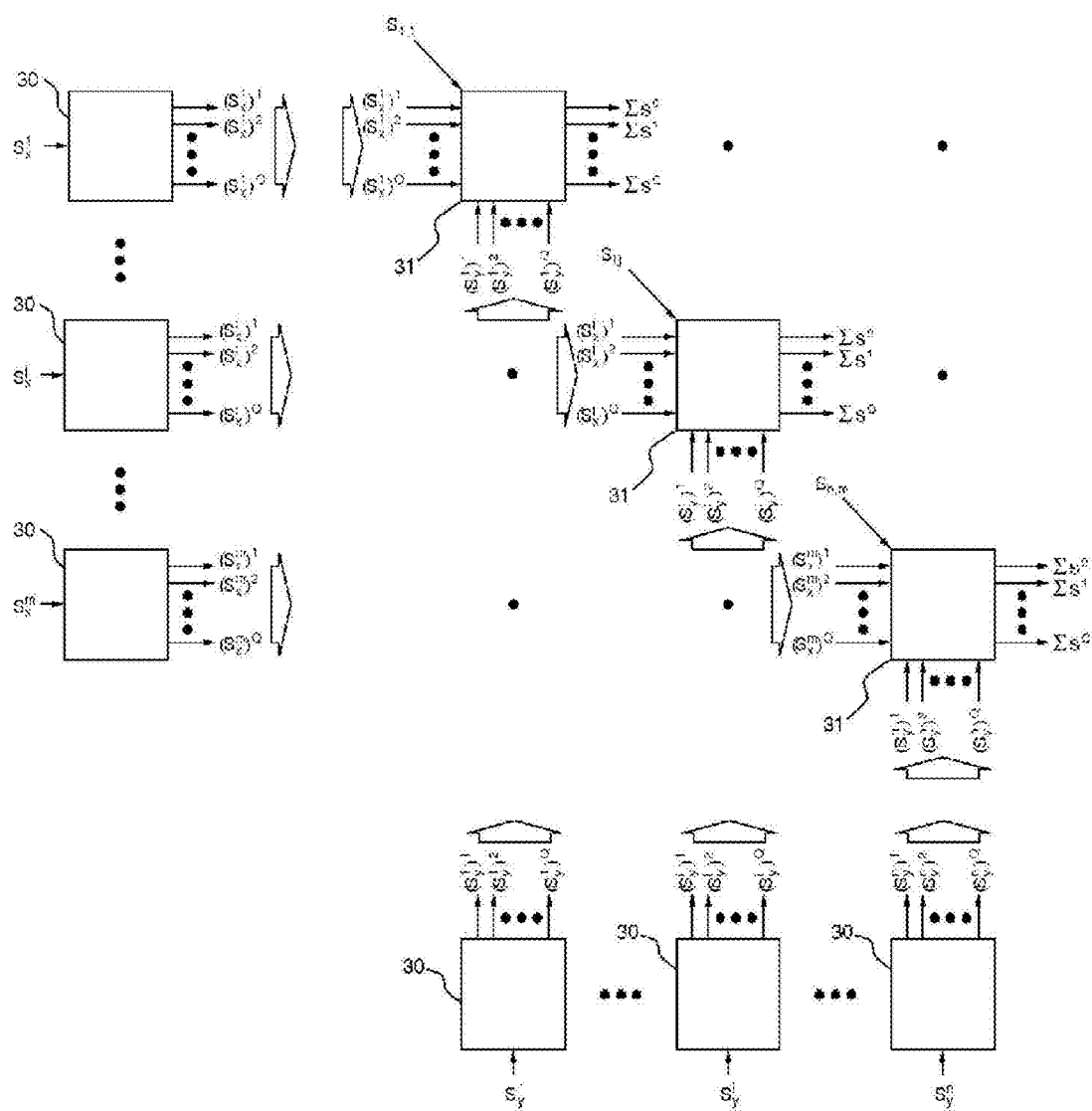
FIG. 10 shows a third execution of the readout electronic circuit according to the invention that performs the computation of the Cartesian moments by using the modules in FIGS. 6 and 8.

FIG. 10 shows a fourth implementation of the readout electronic circuit of the invention in case of using linear combinations of the moments at the directions x and y. Again, a total of M+N modules 30 is used for the generation of weights according to the circuit in FIG. 6, and the necessary powers are generated for (M+N)×Q weights $(S_x^1)^1, \ldots, (S_x^1)^Q, \ldots (S_x^N)^1, \ldots, (S_x^N)^Q$ and $(S_1^1)^1, \ldots, (S_1^1)^Q, \ldots (S_y^M)^1, \ldots, (S_y^M)^Q$ from M+N values $S_x^1$ and $S_y^1$ in records 21 (FIG. 6). Although the weights $(S_x^1)^1, \ldots, (S_x^1)^Q, \ldots (S_x^N)^1, \ldots, (S_x^N)^Q$ and $(S_y^1)^1, \ldots, (S_y^1)^Q, \ldots (S_y^M)^1, \ldots, (S_y^M)^Q$ are obtained by repeated multiplication of the stored values $S_x^1$ and $S_y^1$, now it depends on the function ƒ (part 25) implemented in the circuit of FIG. 8, whether the circuit as shown in FIG. 10 computes the Cartesian moments of the set of input signals $S_{l,k}$, or not. The (M+N)×Q coefficients are distributed to the M×N modules 25 of function ƒ according to FIG. 8 where compound coefficients are created for the function ƒ, for example $S_x^q + S_y^p, S_x^q \times S_y^p$ or similar, where p and q are exponents between 0 and Q. Each of these compound coefficients are multiplied (multipliers 26) by each of the input signals $S_{l,k}$. The resulting signals are added with analog adders on all the modules 31 according to their order Q to obtain the M×N×Q compound coefficients $\Sigma(S_x^1 \circ S_y^1)$, $\Sigma(S_x^Q \circ S_y^1), \Sigma(S_x^1 \circ S_y^2), \ldots, \Sigma(S_x^Q \circ S_y^Q)$, (where ° represents the operator of function ƒ). For better visibility, FIG. 10 only shows 6 of the M+N modules for the generation of weights and 3 of the M×N signal multipliers. It is also possible to combine the solutions according to FIG. 9 and FIG. 10.

The implementation of the readout electronic circuits of FIGS. 4, 5, 9 and 10 may be done by using ASICs, discrete circuits or hybrid circuits, ASICs. Especially in the cases of silicon photomultipliers or position sensitive radiation detectors sensitive to position such as micro strip detectors, this will allow the integration of the segments of the photodetector or radiation detector and a variant of the readout electronic circuits of FIG. 4, 5, 9 or 10 on the same substrate of the detector or photodetector.

Figure 11:
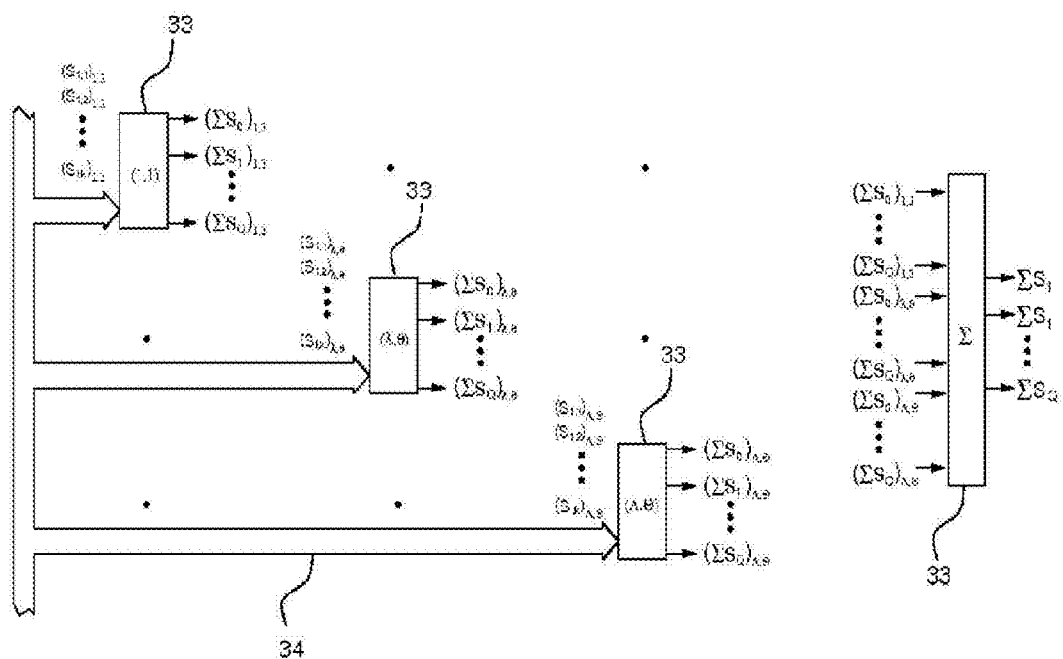
FIG. 11 shows how to combine multiple readout electronic circuits according to the earlier proceedings when the M×N number of segments in the pixel sensor is greater than the number of segments that a single readout electronic circuit is able to process.

Another possibility of implementation would be the use of hybrid circuit modules or discrete modules. Since the weights for the computation of the coefficients $\alpha_{i,j}$ or $\alpha_i$ and $\alpha_j$ are programmable by means of data records and a digital data bus, multiple ASICs, hybrid modules or discrete modules may be used as a whole according to FIG. 11, for calculating these coefficients in case the numbers N and M are higher that the inputs provided by the circuit according to FIG. 4, 5, 9 or 10. Equation (5) may be rewritten in the following manner $$\alpha_{i,j} = \Sigma\Sigma\alpha_{i_\lambda,j_\theta}, \text{ con } \alpha_{i_\lambda,j_\theta} = \Sigma_{i_\lambda}\Sigma_{k_\theta}P_{i_\lambda}x_{i_\lambda}P_{j_\theta}x_{k_\theta}\int\!\!\int(x,y)dxdy \qquad (8)$$

where the partial adding $\alpha_{i_\lambda,j_\theta}$ is calculated in the circuit λ,θ of the λxθ ASIC's 33 or hybrid modules 33 or discrete modules 33, being λ=1, 2, . . . , Λ and θ=1, 2, . . . , Θ. In this way, Q×Λ×Θ signals $\alpha_{i_\lambda,j_\theta}$ are generated, which are added according to their order with Q additional external adders 32. There is also the possibility of using an additional ASIC, a hybrid module or a discreet module according to the FIG. 4, 5, 9 or 10 to perform this sum.

Preferential Executions of the Invention
Gamma-Ray Detectors

Figure 12:
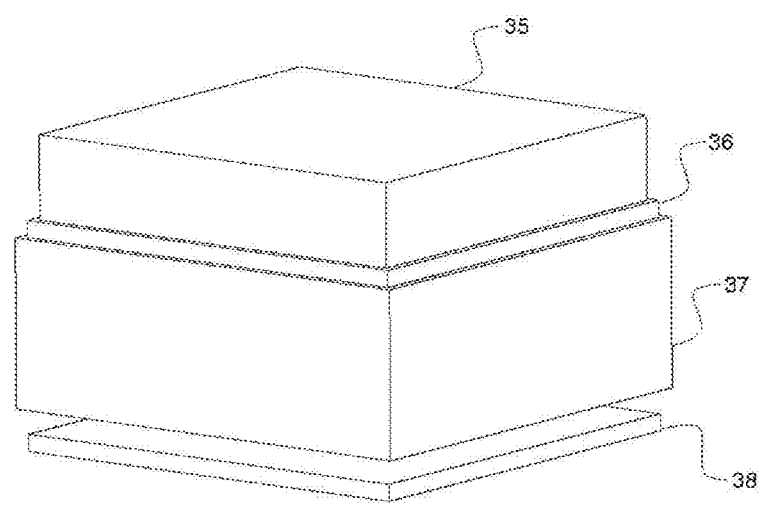
FIG. 12 shows an example of application of the invention to a gamma-ray detector with a single scintillation crystal and a single photodetector sensitive to position.

As mentioned earlier in this document, an application of this invention is the gamma-ray detectors used in devices such as PETs and SPECTs. The need for more information on the three-dimensional position of the photoconversion is especially important for the detection of high energy radiation. This requires very dense and heavy materials for the execution of the detector and therefore it reduces the usefulness of radiation detectors based on semiconductors and favors the use of the combination of scintillators and photodetectors. FIG. 12 shows an example of a readout electronic circuit in accordance with the invention applied to this case, appreciating the scintillator 35, optical coupling means 36, the photodetector sensitive to position 37 or a set of photodetectors, where 38 is the readout electronic circuit of the invention. In this first example, the number of inputs of the readout electronic circuit meets $N_c > N_{fd}$, $M_c > M_{fd}$, where $N_{fd}, M_{fd}$ are the numbers of segments of the position sensitive photodetector or a set of photodetectors. That is, the readout electronic circuit 38 has more entries than pixels in the photodetector 37, so that a single readout electronic circuit 38 is sufficient for reading all the signals.

Figure 13:
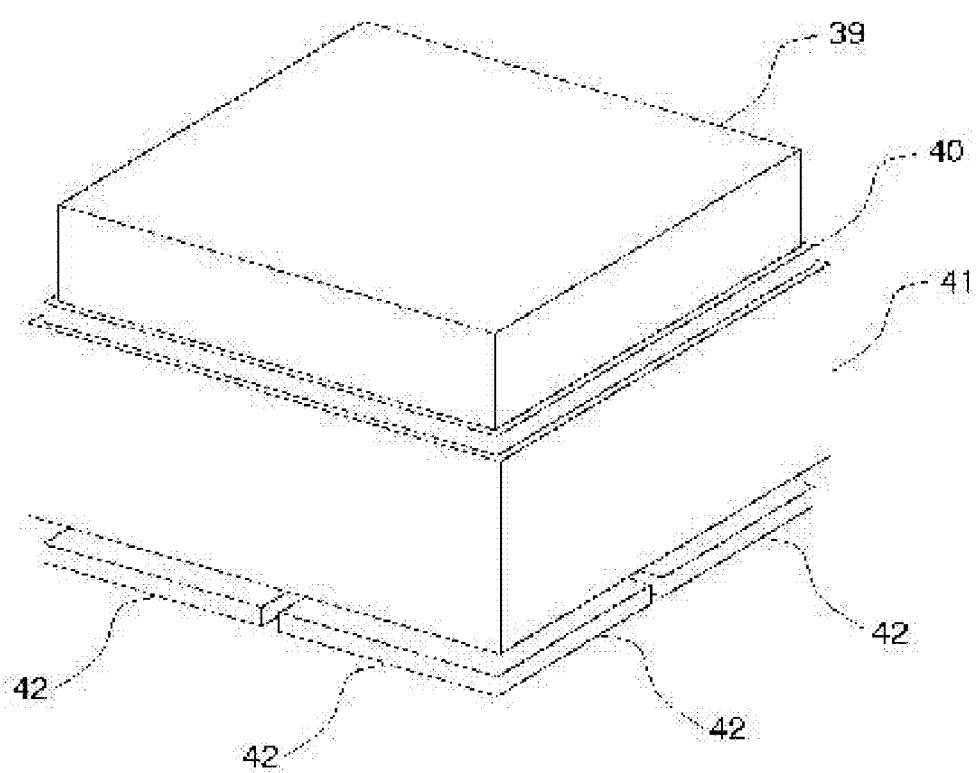
FIG. 13 shows an example of application of the invention to a gamma-ray detector with a single scintillation crystal and a single photodetector sensitive to position when the number of segments of the photodetector is greater than the number of segments that a single readout electronic circuit may process.

Otherwise, in the case of $N_c<N_{fd}$, $M_c<M_{fd}$, the implementation according to FIG. 13 is used, where 39 is the scintillator, 40 is the optical coupling means, 41 is the position sensitive photodetector or a set of photodetectors and 42 is the readout electronic circuit of the invention. Since the outputs are processed with the adder 33 in FIG. 11, there is no increase in the required number of electronic channels.

Figure 14:
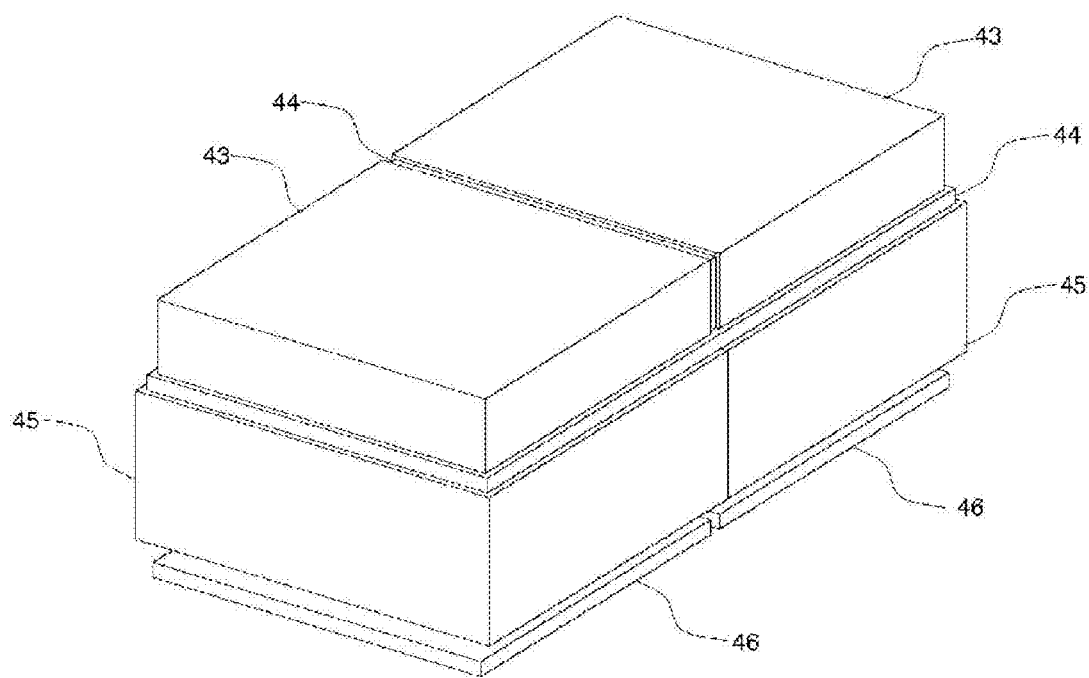
FIG. 14 shows an application of the invention to a gamma-ray detector with several scintillation crystals and several photodetectors sensitive to position.

This invention may also be used to overcome the limitation in the size of the detector imposed by the reduced size of the scintillator crystal. A wide variety of scintillators may only be produced up to a limit size, given by the production process. In the case that the gamma-ray detector should be larger than the size limit of the scintillator, two or more scintillation crystals may be placed together, as shown in FIG. 14. Although each of the crystals 43 has its own position sensitive photodetector or set of photodetectors 45 and its own readout electronic circuit 46 according to the invention, the detector may be considered as a single module since the outputs will be processed with the adder 33 in FIG. 11. In FIG. 14, 44 refers to the means of optical coupling.

Artificial Vision

For the use of this invention in the field of artificial vision, any implementation according to FIGS. 3 to 8 may be connected to the CMOS image sensor integrated into the vision system on a chip. In this case, it is possible to connect a readout electronic circuit with N×N outputs to the matrix of N×N pixels of the integrated CMOS image sensor. This allows the computing of global moments of the image by analog means and therefore instant means for its later scan with a block of analog-digital converters. For proper functioning and for operations that are not possible with this reading electronic circuit, the system must continue to have the control logic for the pixels and the conventional reading system of read/scan. Many applications in artificial vision require the computation of local moments, i.e. moments computed from the values of a small subset of M×L pixels, with M<N and L<N. In order to compute the local moments with the readout electronic circuit, a matrix of M×L analog memory cells is required, for example Sample & Hold elements, which may be connected between the CMOS image sensor and the expansion circuit. Alternatively, a block may perform previous operations, which may be executed in analog manner, such as contour filters, based on the discrete gradient and a subsequent comparison to select only values above a certain threshold. It is also possible to provide means for this type of analog pre-processing and additionally a matrix of M×L analog memory cells. For the case M=N and L=1, the expansion circuit computes the moments on a row of pixels of the CMOS image sensor.

REFERENCES

[Nadler1993] Pattern Recognition Engineering, Morton Nadler, Eric P. Smith, John Wiley & Sons Inc. 1993
[Hornberg2006] Handbook of Machine Vision, Alexander Hornberg, Wiley-VCH, 2006
[Sohn2002] CMOS active pixel sensor, Sohn, II-young (Yongin-shi, KR), U.S. Pat. No. 6,365,950
[Moses1994] Design studies for a pet detector module using a pin photodiode to measure depth of interaction, Moses et al., IEEE Transactions on Nuclear Science (ISSN 0018-9499), vol. 41, no. 4, pt. 1, p. 1441-1445 (1994)
[Bard1991] A depth-encoded PET detector, Bartzakos et al., IEEE Transactions on Nuclear Science, vol. 38, no. 2, pp. 732-738 (1991)
[Seidel1999] Depth identification accuracy of a three layer phoswich PET detector module, Seidel et al., IEEE Transactions on Nuclear Science, vol. 46, no. 3, pp. 485-490 (1999)
[Camp1998] A readout chip for a 64×64 pixel matrix with 15-bit single photon counting Campbell et al. IEEE Transactions on Nuclear Science, vol. 45, no. 3, pt. 1, pp. 751-753 (1998)
[Olli2007] A front-end readout mixed chip for high-efficiency small animal PET imaging, Nucl. Ins. Met. A, vol. 571, pp. 312-316 (2007)
[Weng2002] A High-Speed, Low-Noise CMOS 16-Channel Charge-Sensitive Preamplifier ASIC for APD-Based PET Detectors, IEEE Nuclear Science Symposium Record, vol. 1, pp. 539-543 (2002)
[Wallmark 1959] A new semiconductor cell using lateral photoeffect, Proceedings of the IRE, vol. 45, no. 4, pp. 474-483, 1957
[Yeom2007] A waveform sampling front-end ASIC for readout of GSO/APD with DOI information, Nucl. Ins. & Meth. A, Volume 571, 381-384 (2007)
[Cherry1997] MicroPET: a high resolution PET scanner for imaging small animals. IEEE Transactions on Nuclear Science, vol. 44, pp. 1161-1166 (1997)
[Pichler1997] Studies with a prototype high resolution PET scanner based on LSO-APD modules, IEEE Nuclear Science Symposium (1997) http://ieeexplore.ieee.orq/xpl/RecentCon.jsp?punumber=5472
[Binkley2000] A power-efficient, low-noise, wideband, integrated. CMOS preamplifier for LSO/APD PET systems, IEEE Trans. Nucl. Sci., vol. 47, no. 3, pp. 810-817 (2000)
[Streun2002] A PET system with free running ADCs, Nucl. Ins. & Meth. A, vol. 486, pp. 18-21 (2002)
[Lerche2005] Depth of interaction within continuous crystals from the width of its scintillation light distribution. IEEE Trans. Nucl. Sci., 52(3):560-572, 2005
[Benlloch2006] Gamma Ray Detector with Interaction Depth Coding, US Patent No 2006/0192128 A1
[Lerche2006] Depth of interaction enhanced gamma-ray imaging for medical applications. Christoph W. Lerche, (Universidad de Valencia), Ph.D. Thesis, 2006
[Herrero2007] Front-end circuit for position sensitive silicon and vacuum tube photomultipliers with gain control and depth of interaction measurement, Nucl. Ins. & Meth. A, Volume 576(1):118-122, June 2007

The invention claimed is:

1. A readout electronic circuit of the signals generated by one or more pixel sensors of M×N segments, said readout electronic circuit being configured to perform the calculation of expansion coefficients in a set of basis functions of a two-dimensional distribution of signals, wherein said readout electronic circuit is formed by analog components.

2. The readout electronic circuit of claim 1, wherein it is interconnectable with other similar readout circuits.

3. The readout electronic circuit of claim 1, further comprising storage media programmable for the storage of the weights used in the expansion, so that it is possible to carry out the expansion according to different basis functions.

4. The readout electronic circuit of claim 3, wherein the weights correspond to Legendre polynomials, Gegenbauer polynomials, Chebyshev polynomials, Laguerre polynomials, Zernike polynomials or trigonometric functions used in Fourier series.

5. The readout electronic circuit of claim 1, wherein said readout electronic circuit is integrated into the sensor substrate.

6. The readout electronic circuit of claim 1, further comprising:
- (M×N) copy blocks, which double the $S^{In}$ signal generated by each segment of the pixel sensor;
- (M+N) adders totaling $S^{In}$ signals by rows and columns;
- (M+N) calculation blocks, which include Q+1 multipliers and Q+1 storage media connected to Q+1 digital-to-analog converters, where the sum of $S^{In}$ signals of each column and each row is multiplied by the Q+1 first expansion weights stored in the storage media, obtaining the coefficients $S_1, S_2 \ldots S_{Q+1}$, and
- (Q+1) adders, adding $S_1, S_2 \ldots S_{Q+1}$ coefficients for each order of the coefficient by rows and columns.

7. The readout electronic circuit of claim 1, further comprising for each M×N segments of the pixel sensor:
- 2(Q+1) storage media that stores respectively the weights corresponding to x- and y-axis, which are connected to 2(Q+1) digital-to-analog converters;
- 2(Q+1) multipliers, which multiply the different combinations of the weights corresponding to x- and y-axis; and
- $(Q+1)^2$ multipliers, that multiply the results obtained by the multipliers by $S^{In}$ signals of each segment of the pixel sensor.

8. The readout electronic circuit of claim 1, further comprising:
- (M+N) modules that generate the (M+N)×Q Cartesian moments of $S_{lk}$ signals generated by the segments of the pixel sensor, each module forming a cascade of multipliers that generate the weights $(S_x)^r$, where $S_x$ is obtained from a digital data bus connected to a storage media and to a digital-to-analog converter; and
- (M×N) multipliers that multiply $S_{lk}$, signals by weights $(S_x)^r$, each of the multipliers forming a buffer of variable gain which distributes output between several multipliers that perform the multiplication between the $S_{lk}$ signal and the weights, and a few adders that add separately the results of the previous operation for each order of the coefficients.

9. The readout electronic circuit of claim 1, further comprising:
- (M+N) modules that generate the (M+N)×Q Cartesian moments of $S_{lk}$ signals generated by the segments of the pixel sensor, each module forming a cascade of multipliers that generate the weights $(S_x)^r$, where $S_x$ is obtained from a digital data bus connected to a storage media and to a digital-to-analog converter; and
- (M×N) multipliers that multiply $S_{lk}$ signals by compound coefficients, each of the multipliers forming a buffer of variable gain which distributes output between several multipliers that perform the multiplication between the $S_{lk}$ signal and the compound coefficients, and a few adders that add separately the results of the previous operation for each order of the coefficients, and where the compound coefficients are obtained by a block of "f" function.

10. The reading procedure of the signals generated by one or more pixel sensors of M×N segments, which performs the calculation of expansion coefficients in a set of basis functions of a two-dimensional distribution of signals, comprising the operation of implementing the equation $\alpha_{ij} = \Sigma_{l=1}^{N} \Sigma_{k=1}^{M} P_i(x_l) P_j(x_k) \iint f(x,y) dx dy$ analog components.

11. The procedure of claim 10, wherein it simplifies the equation $\alpha_{ij} = \Sigma_{l=1}^{N} \Sigma_{k=1}^{M} P_i(x_l) P_j(x_k) \iint f(x,y) dx dy$, so that the expansion coefficients are obtained by implementing the equations:

$$\alpha_i = \Sigma_{l=1}^{N} P_i(x_l) \int f(x,y) dy$$

and $$\alpha_j = \Sigma_{k=1}^{M} P_j(x_k) \int f(x,y) dx.$$

* * * * *